(12) United States Patent
Lan

(10) Patent No.: US 11,829,219 B1
(45) Date of Patent: Nov. 28, 2023

(54) TRANSMITTER OF A WIRELESS POWER TRANSFER SYSTEM

(71) Applicant: MegaHz Tech Ltd., Guangdong (CN)

(72) Inventor: Lingxin Lan, Guangdong (CN)

(73) Assignee: MegaHz Tech Ltd., Shenzhen (CN)

( * ) Notice: Subject to any disclaimer, the term of this patent is extended or adjusted under 35 U.S.C. 154(b) by 0 days.

(21) Appl. No.: 18/113,637

(22) Filed: Feb. 24, 2023

(30) Foreign Application Priority Data

Feb. 9, 2023 (CN) .......................... 202310123545.0

(51) Int. Cl.
  *G06F 1/26* (2006.01)
  *H02M 1/00* (2006.01)
  *H02M 7/5395* (2006.01)
  *H02J 50/12* (2016.01)

(52) U.S. Cl.
  CPC ................ *G06F 1/26* (2013.01); *H02J 50/12* (2016.02); *H02M 1/0058* (2021.05); *H02M 7/5395* (2013.01)

(58) Field of Classification Search
  CPC . G06F 1/26; H02J 50/12; H02J 50/80; H02M 1/0058; H02M 7/5395; H01F 38/14
  See application file for complete search history.

(56) References Cited

U.S. PATENT DOCUMENTS

| | | | | |
|---|---|---|---|---|
| 2012/0161538 A1* | 6/2012 | Kinoshita | ............... | H02J 50/12 307/104 |
| 2012/0287985 A1* | 11/2012 | Okamura | ............... | H04L 25/02 375/300 |
| 2014/0035364 A1* | 2/2014 | Uramoto | ............... | H02J 50/70 307/17 |
| 2014/0139034 A1* | 5/2014 | Sankar | ............... | H02J 50/12 307/104 |
| 2014/0333259 A1* | 11/2014 | Akiyoshi | ............... | H02J 50/12 320/108 |
| 2017/0126063 A1* | 5/2017 | Pan | ............... | H02J 50/80 |
| 2021/0203192 A1* | 7/2021 | Lan | ............... | H02J 50/60 |
| 2022/0029463 A1* | 1/2022 | Alam | ............... | H02J 50/40 |

* cited by examiner

*Primary Examiner* — Danny Chan

(57) ABSTRACT

A transmitter of a wireless power transfer system is provided. The transmitter comprises a processor and a memory. The memory stores executable instructions that, in response to execution by the processor, can cause the processor to receive one or more signals generated by an inverter of the transmitter. The processor can measure or obtain a first value of the one or more signals and perform a comparison between the first value and a second value of the one or more signals. Based on the comparison, the processor can adjust at least one parameter of a pulse width modulation (PWM) signal generated by the processor that controls the inverter to maintain the inverter in a soft switching state.

20 Claims, 6 Drawing Sheets

TRANSMITTER OF A WIRELESS POWER TRANSFER SYSTEM

TECHNOLOGICAL FIELD

The present disclosure relates generally to a transmitter of a wireless power transfer system, and in particular, to a transmitter of a wireless power transfer system that can control the wireless power transfer system based on input signals generated by an inverter of the transmitter.

BACKGROUND

Wireless power transfer (WPT), or inductive power transfer (IPT) is a way of transferring electrical energy without using physical wires. Such technologies not only bring convenience to daily charging of electronic devices, but also make power transmission safer by avoiding short circuit or electrical shock caused by exposed or damaged wires.

Conventionally, in a WPT system, such as a high frequency WPT system, e.g., a WPT system with a switching frequency higher than 1 MHz, compensation networks are used to keep the system efficient. Using compensation networks may allow the WPT system, more specifically the inverter of the WPT system to work in a high efficiency state, e.g., a soft switching state, within a limited range of loading conditions. When the loading conditions exceed the limited range, or if there are foreign objects (especially metal objects) present near the WPT system, the inverter may shift its state to a less efficient state, e.g., a hard switching state, which significantly increases the energy loss, and may cause a rise in component temperature or even cause component failure of the WPT system.

Therefore, it would be desirable to have a system and method that takes into account at least some of the issues discussed above, as well as other possible issues.

BRIEF SUMMARY

Example implementations of the present disclosure are directed to a transmitter of a wireless power transfer system that can control the wireless power transfer system based on input signals generated by an inverter of the transmitter. Example implementations can control a WPT system based on current and/or voltage signals generated by an inverter of the transmitter to keep the WPT system efficient, regardless of the loading conditions of the WPT system.

Example implementations of the present disclosure can take the input current or switching voltage waveform, e.g., the drain-source voltage waveform of the switching transistor, or both in real-time and process them in real-time. Based on the processed results, example implementations can generate or adjust a pulse width modulation (PWM) signal that controls the WPT system in real-time. For example, the frequency, duty cycle and phase of the PWM signal may be adjusted. Some WPT systems may have more than one PWM signal that can be adjusted. By doing so, the WPT system can be maintained to operate in a high efficiency state, e.g., a soft switching state, regardless of the loading conditions such as movement of the transmitter side or receiver side of the WPT system, or the change of the power delivery of the WPT system, or the presence of foreign objects. Also, example implementations only use signals from the WPT transmitter side such as the inverter, without using any feedback information from the receiver side, which may simplify the implementation and increase the efficiency, robustness and stability of the system.

The present disclosure thus includes, without limitation, the following example implementations.

Some example implementations provide a method of controlling a wireless power transfer system, comprising: receiving one or more signals generated by an inverter of a transmitter of the wireless power transfer system; measuring or obtaining a first value of the one or more signals; performing a comparison between the first value and a second value of the one or more signals; and based on the comparison, adjusting at least one parameter of a pulse width modulation (PWM) signal generated by a processor of the transmitter, wherein the PWM signal controls the inverter to maintain the inverter in a soft switching state.

In some example implementations of the method, the one or more signals include a current signal generated by the inverter.

In some example implementations of the method, the first value includes an ampere value of the current signal, and wherein the at least one parameter includes a frequency of the PWM signal, or a phase of the PWM signal, or a duty cycle of the PWM signal.

In some example implementations of the method, adjusting the at least one parameter of the PWM signal includes adjusting the at least one parameter of the PWM signal according to an inverse relation between the at least one parameter and the ampere value.

In some example implementations of the method, the one or more signals include a plurality of voltage signals generated by the inverter, and measuring or obtaining the first value includes: assigning each of a plurality of weights to each of the plurality of voltage signals respectively; and calculating the first value including calculating a sum of products of each of the plurality of weights and each of the plurality of voltage signals respectively.

In some example implementations of the method, the at least one parameter includes a frequency of the PWM signal, or a phase of the PWM signal, or a duty cycle of the PWM signal, and adjusting the at least one parameter of the PWM signal includes adjusting the at least one parameter of the PWM signal according to a sign of the first value.

In some example implementations of the method, adjusting the at least one parameter of the PWM signal includes adjusting the at least one parameter of the PWM signal without using feedback information transmitted from a receiver of the wireless power transfer system.

Some example implementations provide a transmitter of a wireless power transfer system. The transmitter comprises a processor and a memory storing executable instructions that, in response to execution by the processor, cause the processor to at least perform the method of any preceding example implementation, or any combination of any preceding example implementations.

Some example implementations provide a computer-readable storage medium for controlling a wireless power transfer system. The computer-readable storage medium is non-transitory and has computer-readable program code stored therein that in response to execution by a processor, causes the processor to at least perform the method of any preceding example implementation, or any combination thereof.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Figure 1:
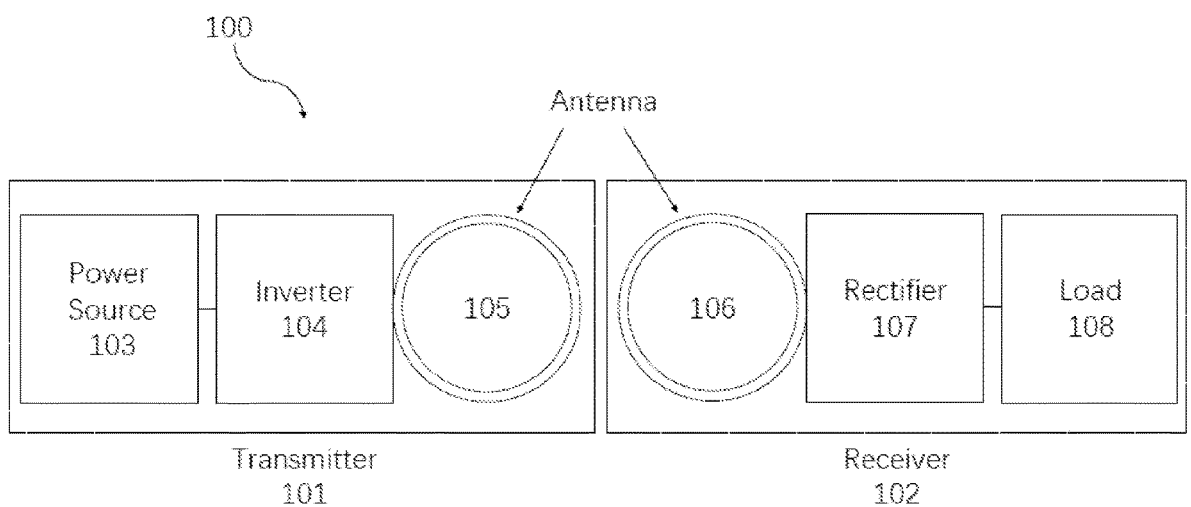
FIG. 1 illustrates a WPT system, according to one embodiment of the present disclosure.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Like reference numerals refer to like elements throughout.

The system is primarily described in the context of a WPT system, but it should be understood that the system is equally applicable to some DC-DC and rectifier systems.

FIG. 1 illustrates a WPT system 100, according to one embodiment of the present disclosure. As shown, the WPT system 100 includes a transmitter 101 and a receiver 102. The transmitter 101 may include a power source 103, an inverter 104 and a transmitting antenna 105. In some examples, the power source 103 may be a DC voltage source or a battery, the inverter 104 may be a class E power amplifier, and the transmitting antenna 105 may be a coil. The receiver 102 may include a receiving antenna 106, a rectifier 107 and a load 108. In some examples, the receiving antenna 106 may be a coil, the rectifier may be a full-bridge rectifier, and the load may be a resistor or a battery. It should also be understood that the WPT system 100 may include one or more additional or alternative subsystems or components than those shown in FIG. 1.

In some examples, the WPT system 100 may work or operate by generating an alternating magnetic field around the transmitting antenna 105 using the inverter 104. The power source supplies a DC voltage to the inverter. The generated alternating or changing magnetic field can be picked up or received by the receiving antenna 106. The generated alternating or changing magnetic field can be converted back to a DC power using the rectifier 107, and the DC power can provide power to the load 108.

Figure 2:
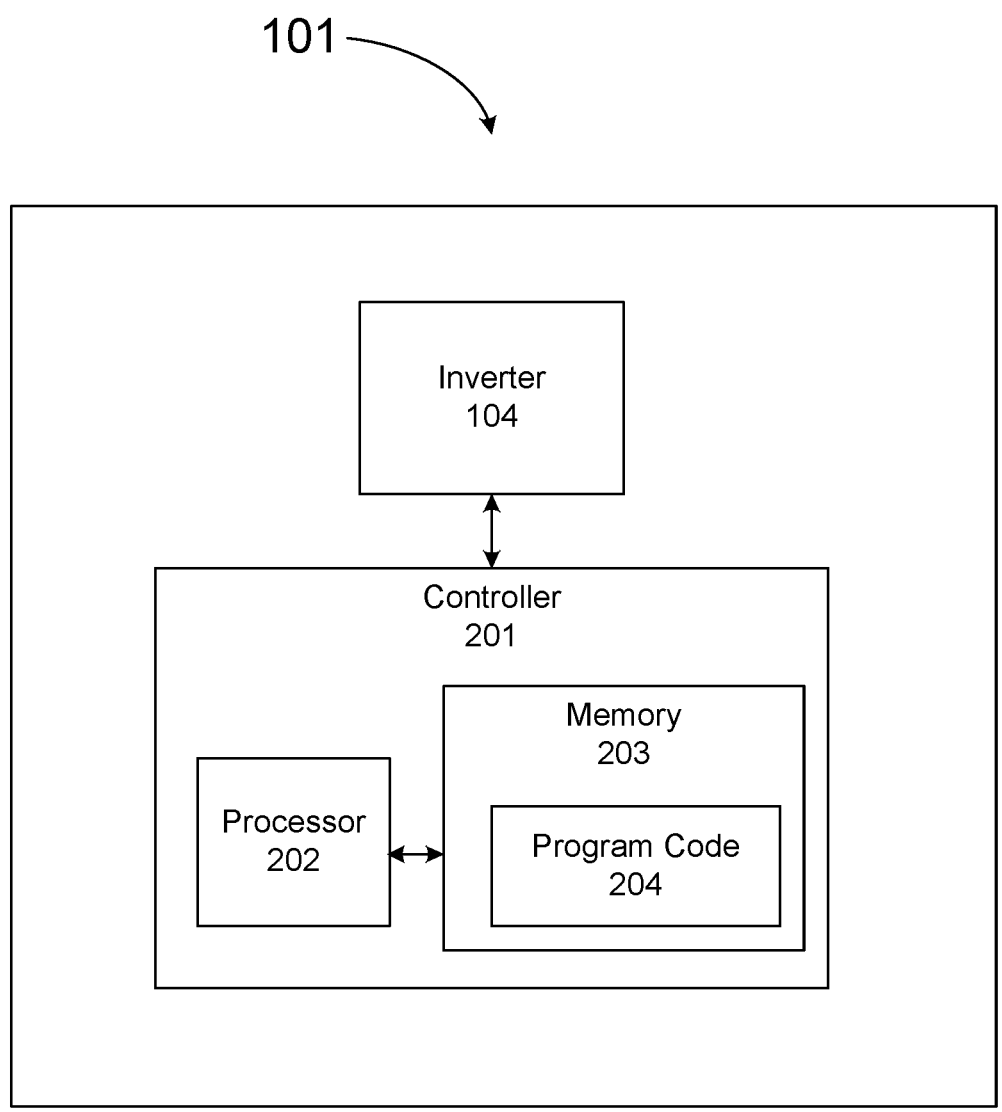
FIG. 2 illustrates a transmitter of the WPT system, according to one embodiment of the present disclosure.

FIG. 2 illustrates the transmitter 101 of the WPT system 100, according to one embodiment of the present disclosure. As shown, in this embodiment, the transmitter 101 includes the inverter 104 and a controller 201. The power source and transmitting antenna are omitted in FIG. 2 for simplicity of illustration. In one embodiment, the controller 201 includes a processor 202 and a memory 203 coupled to the processor 202. The processor 202 may itself include a memory 203.

In some examples, the processor 202 may be a microprocessor or microcontroller unit (MCU). The processor 202 may be composed of one or more processors alone or in combination with one or more memories. The processor is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 203 (of the same or another apparatus).

The processor 202 may be a number of processors, a multi-core processor or some other type of processor, depending on the particular implementation. Further, the processor may be implemented using a number of heterogeneous processor systems in which a main processor is present with one or more secondary processors on a single chip. Although the processor may be capable of executing a computer program to perform one or more functions, the processor of various examples may be capable of performing one or more functions without the aid of a computer program. In either instance, the processor may be appropriately programmed to perform functions or operations according to example implementations of the present disclosure.

In some examples the memory 203 may be a computer-readable storage medium. The computer-readable storage medium is a non-transitory device capable of storing information, and is distinguishable from computer-readable transmission media such as electronic transitory signals capable of carrying information from one location to another. The memory 203 is generally any piece of computer hardware that is capable of storing information such as, for example, data, computer programs (e.g., computer-readable program code 204) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above.

In one embodiment, the memory 203 stores computer-readable program code 204. The processor 202 is configured to execute computer-readable program code 204 stored in the memory 203. Execution of the program code instructions may produce a computer-implemented process such that the instructions executed by the computer, processor or other programmable apparatus provide operations for implementing functions described herein. Execution of instructions by a processor, or storage of instructions in a computer-readable storage medium, supports combinations of operations for performing the specified functions described herein. It will also be understood that one or more functions, and combinations of functions, may be implemented by special purpose hardware-based computer systems and/or processors which perform the specified functions, or combinations of special purpose hardware and program code instructions.

In some examples, the processor 202 can receive one or more current and/or voltage signals from the inverter 104. The processor can process the received signals. Based on the processed results, the processor can generate a pulse width modulation (PWM) signal or adjust at least one parameter of the PWM signal. The PWM signal can control the inverter to keep working in a high efficiency state, as described in greater details below.

Figure 3:
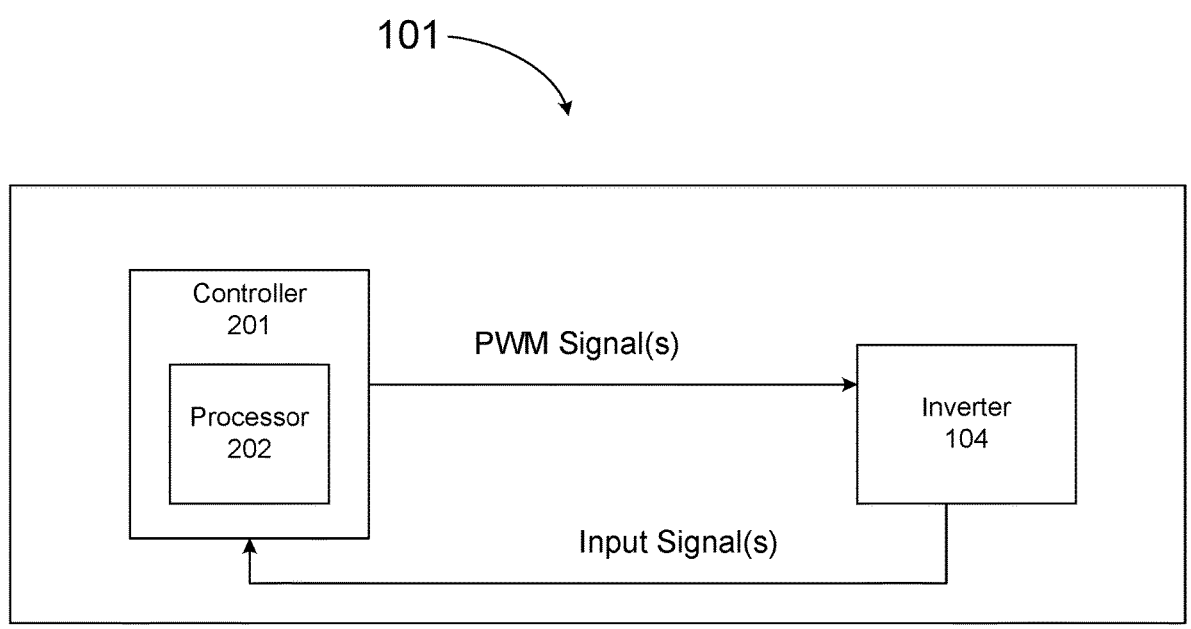
FIG. 3 illustrates a controller controlling an inverter of the transmitter, according to one embodiment of the present disclosure.

FIG. 3 illustrates the controller 201 controlling the inverter 104 of the transmitter 101, according to one embodiment of the present disclosure. As shown, the controller 201 or more specifically the processor 202 of the controller 201 can receive input signal(s) from the inverter 104. The input signal(s) may include one or more current signals, one or more voltage signals or both. The processor 202 can process the received input signal(s). Based on the processed results, the processor 202 can generate pulse width modulation (PWM) signal(s) or adjust at least one parameter of the PWM signal(s). The PWM signal(s) can control the inverter 104 to keep working in a high efficiency state, as described in greater details below. The PWM signal(s) may include more than one PWM signals, such as two PWM signals.

In one embodiment, the processor 202 can receive a current signal generated by the inverter 104. This current signal can be measured either directly by the processor 202 using its analog-to-digital converter (ADC), or by a dedicated current sensor. The processor 202 can obtain the current signal measured by the dedicated current sensor. The measured current signals can either be the input current to the inverter 104 or other parts of the inverter 104. The current sensor may be a resistor, or a Hall current sensor. In some examples, the current sensor may output the current signal in terms of average DC input current of the inverter 104, or an AC current waveform such as the AC current in the transmitting antenna 105 which may be a coil.

In some examples, the current sensor may output the current signal as an analog signal and the controller 201 or the processor 202 may include an ADC to convert the received analog current signal to digital current signal for further processing. The ADC can also be a separate component in the transmitter 101.

In one embodiment, the processor 202 can measure or obtain an ampere value of the current signal or a change of the ampere value of the current signal from the inverter 104. In another embodiment, the processor 202 can receive a series of current signals generated by the inverter 104 and measure multiple ampere values or an average ampere value of the series of current signals. The processor 202 can compare the measured ampere value to a pre-defined threshold ampere value of the current signal. The processor 202 can also compare the measured ampere value to a previous measured ampere value of the current signal.

In one embodiment, based on the comparison, the processor 202 may adjust at least one parameter of a PWM signal generated by the processor 202. The PWM signal may control the inverter to maintain the inverter in a soft switching state.

In one embodiment, the at least one parameter includes a frequency of the PWM signal, or a phase of the PWM signal, or a duty cycle of the PWM signal.

In one embodiment, the processor 202 can adjust the at least one parameter of the PWM signal according to an inverse relation between the at least one parameter and the ampere value. For example, if the processor 202 determines that the average ampere value of the series of current signals is increased by 1 A, based on the current signal received from the current sensor, the processor 202 can decrease the duty cycle of the PWM signal by x %. Similarly, if a decrease of average ampere value is determined, the processor 202 can increase the duty cycle of the PWM signal by a certain amount.

In another example, if the processor 202 determines that the average ampere value of the series of current signals is increased by 1 A, the processor 202 can decrease the frequency of the PWM signal by y Hz.

In a further example, if the processor 202 determines that the average ampere value of the series of current signals is increased by 1 A, the processor 202 can decrease the phase of the PWM signal by z degrees. Here x, y and z are positive numbers.

In one embodiment, the processor 202 can receive one or more voltage signals generated by the inverter 104. The voltage signals may be the drain-source voltage across the switching device(s) or transistor(s), or other voltage signals that can be measured in the inverter 104. For example, the processor 202 can receive a series of voltage signals generated by the inverter 104. The controller 201 or the processor 202 may include an analog-to-digital converter (ADC) to convert the received analog voltage signal to digital voltage signal for further processing. The ADC can also be a separate component in the transmitter 101.

In one embodiment, the processor 202 can measure or obtain a series of voltage signals. The voltage signals can be measured either directly by the processor 202 using its ADC, or by a dedicated voltage sensor. The processor 202 can obtain the voltage signals measured by the dedicated voltage sensor. A series of weight values can be used to determine the frequency, duty cycle, or phase of the PWM signal. For example, a series of n voltage signals measured can be denoted as $\alpha_1, \alpha_2, \alpha_3, \ldots \alpha_n$. A weight can be assigned to each of these values. The weights can be determined by trial and error, or by machine learning training such as using support vector machine (SVM). And by taking a sum of products of these values and weights, the output can determine the frequency, duty cycle and/or phase of the PWM signal. The sum of products may be subtracted by a bias. The calculation can be described as the table below.

| Voltage/current signal | $\alpha_1, \alpha_2, \alpha_3 \ldots \alpha_n$ |
|---|---|
| Weights | $\omega_1, \omega_2, \omega_3 \ldots \omega_n$ |
| Bias | $\beta$ |

Sum of products $\left(\sum_{k=1}^{n} \alpha_k \omega_k\right) - \beta$

In one embodiment, the processor 202 can compare the sum of products minus the bias to a pre-defined threshold value. If processor 202 determines that the sum of products minus the bias is positive (i.e., the pre-defined threshold value is zero), the processor 202 can increase the duty cycle of the PWM signal by x'%. If the sum of products minus the bias is negative, the processor 202 can decrease the duty cycle by x'%. Similarly, if processor 202 determines that the sum of products minus the bias is positive, the processor 202 can increase the frequency of the PWM signal by y' Hz and/or increase the phase of the PWM signal by z' degrees. Otherwise, the processor 202 can decrease the frequency by y' Hz and/or decrease the phase by z' degrees. In these embodiments, the processor 202 can adjust the PWM signal according to a sign of the calculated value, e.g., the sum of products minus the bias. Here x', y' and z' are positive numbers.

In some examples, the processor 202 can process the received current signals also by calculating the sum of products, similarly as described above.

In some examples, the processor 202 can adjust the PWM signal based on both the current signals and voltage signals. For example, based on the received current signals, if the processor 202 determines that the average ampere value of the series of current signals is increased by 1 A, this may indicate that the processor 202 should decrease the duty cycle of the PWM signal by m %. On the other hand, based on the received voltage signals, if processor 202 also determines that the sum of products is positive, this may indicate that the processor 202 can increase the duty cycle of the PWM signal by j %. If j>m, then the processor 202 may finally increase the duty cycle of the PWM signal by j %. Here j and m are positive numbers.

In some embodiments, the PWM signal can be generated either by the processor 202, or by a dedicated integrated circuit (IC) such as a FPGA or Phase Locked Loop (PLL) chip, or an analog circuit. The frequency, duty cycle and/or phase of the PWM signal can be adjusted by the processor 202 or the dedicated IC. In some examples, the generated or adjusted signal can also be a digital or analog signal that controls other parts of the WPT transmitter, e.g. the input DC power supply to the inverter.

In the embodiments as described above, the processor 202 can adjust the at least one parameter of the PWM signal without using feedback information transmitted from the receiver 102 of the wireless power transfer system 100. The feedback information may include the output voltage, current, power and temperature of the WPT receiver 102.

In some examples, the processor 202 may generate or adjust more than one PWM signals. Some inverter circuit topologies may include more than one PWM signal, for example, a class E push-pull inverter includes two PWM signals with a 180 degree phase difference. The same solution described in the present disclosure can be easily applied: either the controller generates two PWM signals with a 180 degrees phase shift, or two controllers can be used and each generates one PWM signal.

Figure 4A:
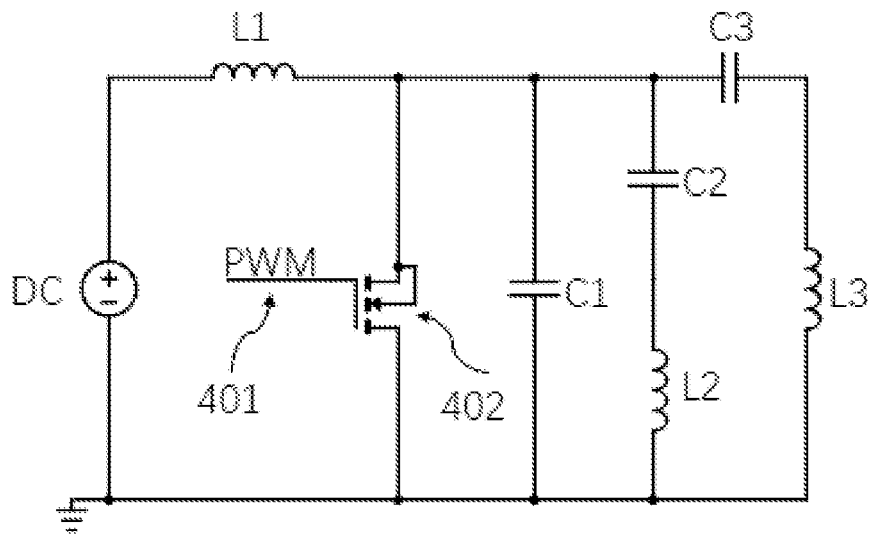
FIGS. 4A and 4B illustrate circuits of an inverter of the transmitter, according to example embodiments of the present disclosure.
Figure 4B:
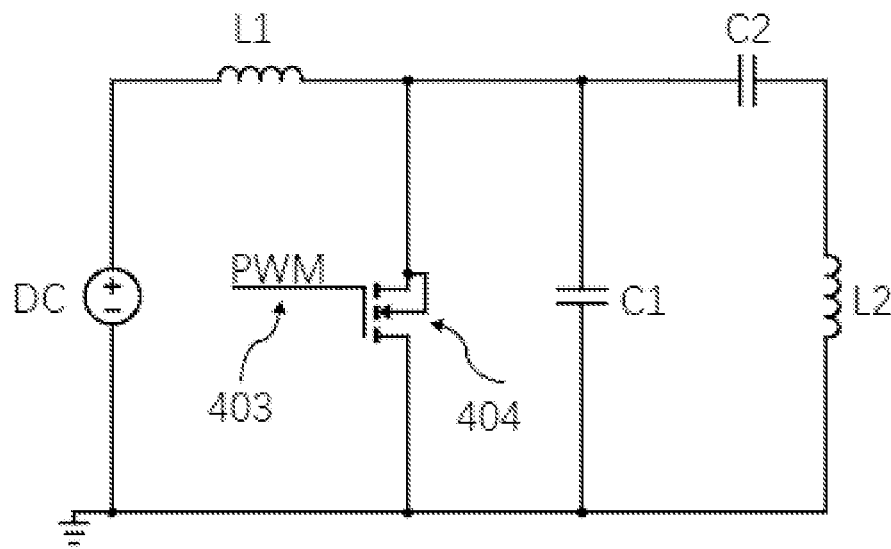

FIGS. 4A and 4B illustrate circuits of the inverter 104 of the transmitter 101, according to example embodiments of the present disclosure. As shown, the generated or adjusted PWM signals 401 and 403 can control turn on and turn off of the switching devices 402 and 404, respectively. The switching devices 402 and 404 can be a MOSFET, or GaN or SiC MOSFET. A gate driver device (not shown) may be used between the PWM signal and the switching device to improve the switching current. The PWM signal's frequency, duty cycle and phase, as described in present disclosure, can be adjusted by the controller 201 to ensure that the switching device 402 or 404 always switches when the voltage across it is or close to zero, i.e., in a soft switching state, not a hard switching state.

In the present disclosure, hard switching and soft switching can describe two different ways of switching on and off power transistor e.g., MOSFET, GaN and SiC, in the inverter 104. Hard switching happens when turning on a transistor while there is a relatively high voltage exists across the drain and source of this transistor, since current would flow through this transistor and it takes time for the drain-source voltage to drop to zero, this would cause a power dissipation in this transistor. Soft switching, on the other hand, is a way to turn on a transistor when the voltage across the drain and source is or close to zero, which significantly reduces the energy dissipation in the switching device.

Figure 5:
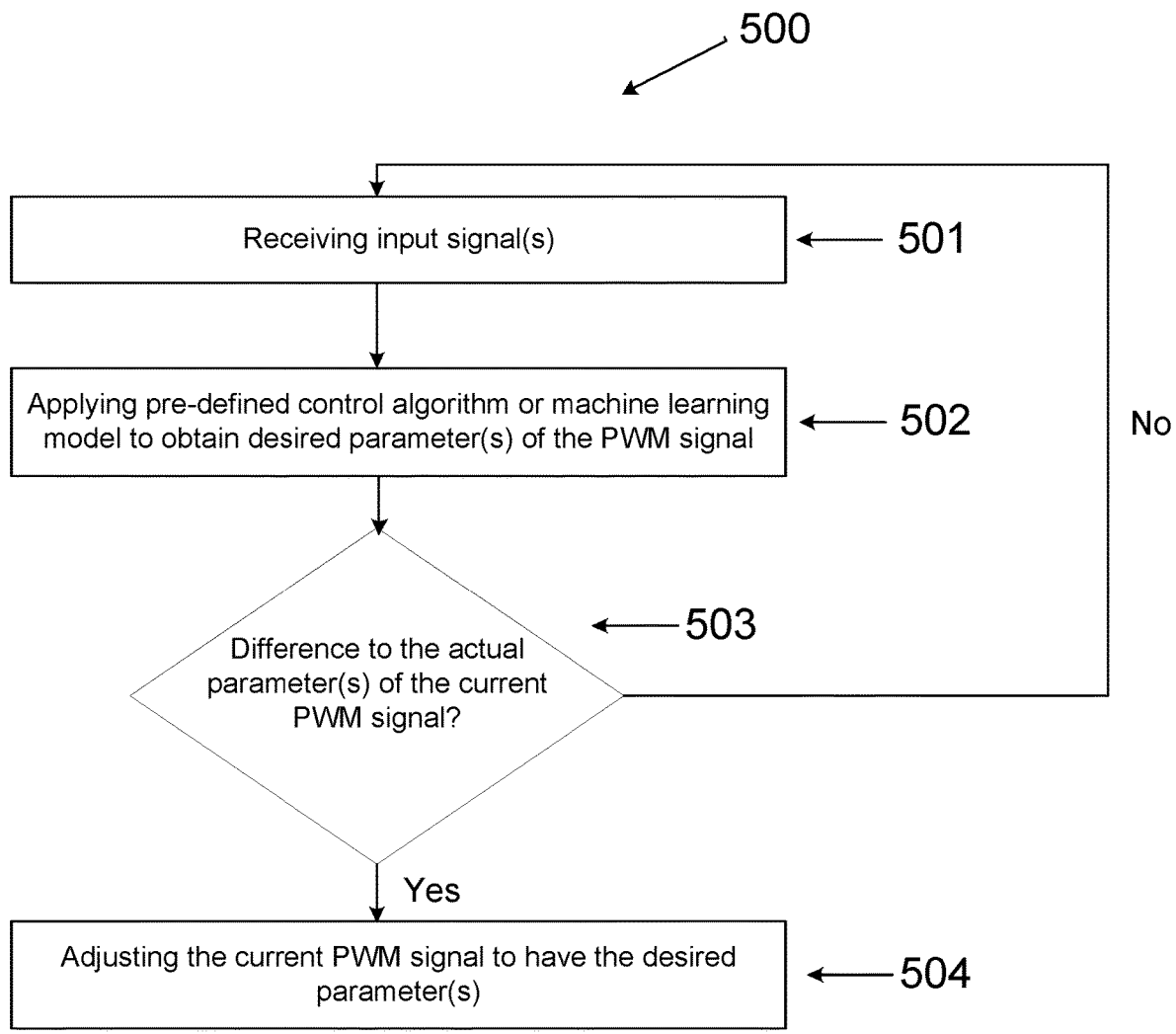
FIG. 5 illustrates a method of controlling an inverter of the transmitter, according to one embodiment of the present disclosure.

FIG. 5 illustrates a method 500 of controlling an inverter of the transmitter, according to one embodiment of the present disclosure. As shown, at block 501, the processor 202 can receive input signal(s) from the inverter 104. The input signal(s) may include one or more current signal, one or more voltage signals or both. At block 502, the processor 202 can apply pre-defined control algorithm or machine learning model to obtain desired parameter(s) of the PWM signal generated by the processor 202, as described with respect to FIG. 3 above. The desired parameter(s) of the PWM signal may include one or more of phase, duty cycle and frequency of the PWM signal. The desired parameter(s) of the PWM signal can maintain the inverter 104 to always operate in a high efficiency state, e.g., a soft switching state.

At block 503, the processor 202 can compare the obtained desired parameter(s) of the PWM signal to the actual parameter(s) of the current PWM signal. If the difference between the desired parameter(s) and the actual parameter(s) is within a threshold range, the method 500 goes back to block 501, where the processor 202 continues to receive and monitor the input signal(s) from the inverter 104. Otherwise, the method 500 proceeds to block 504, where the processor 202 can adjust the current PWM signal to have the desired parameter(s). For example, if the desired frequency of the PWM signal is 100 Hz higher than the actual frequency of the current PWM signal, then the processor 202 can increase the actual frequency of the current PWM signal by 100 Hz. In another embodiment, at block 504, the processor 202 can generate a new PWM signal with the desired parameter(s).

Figure 6:
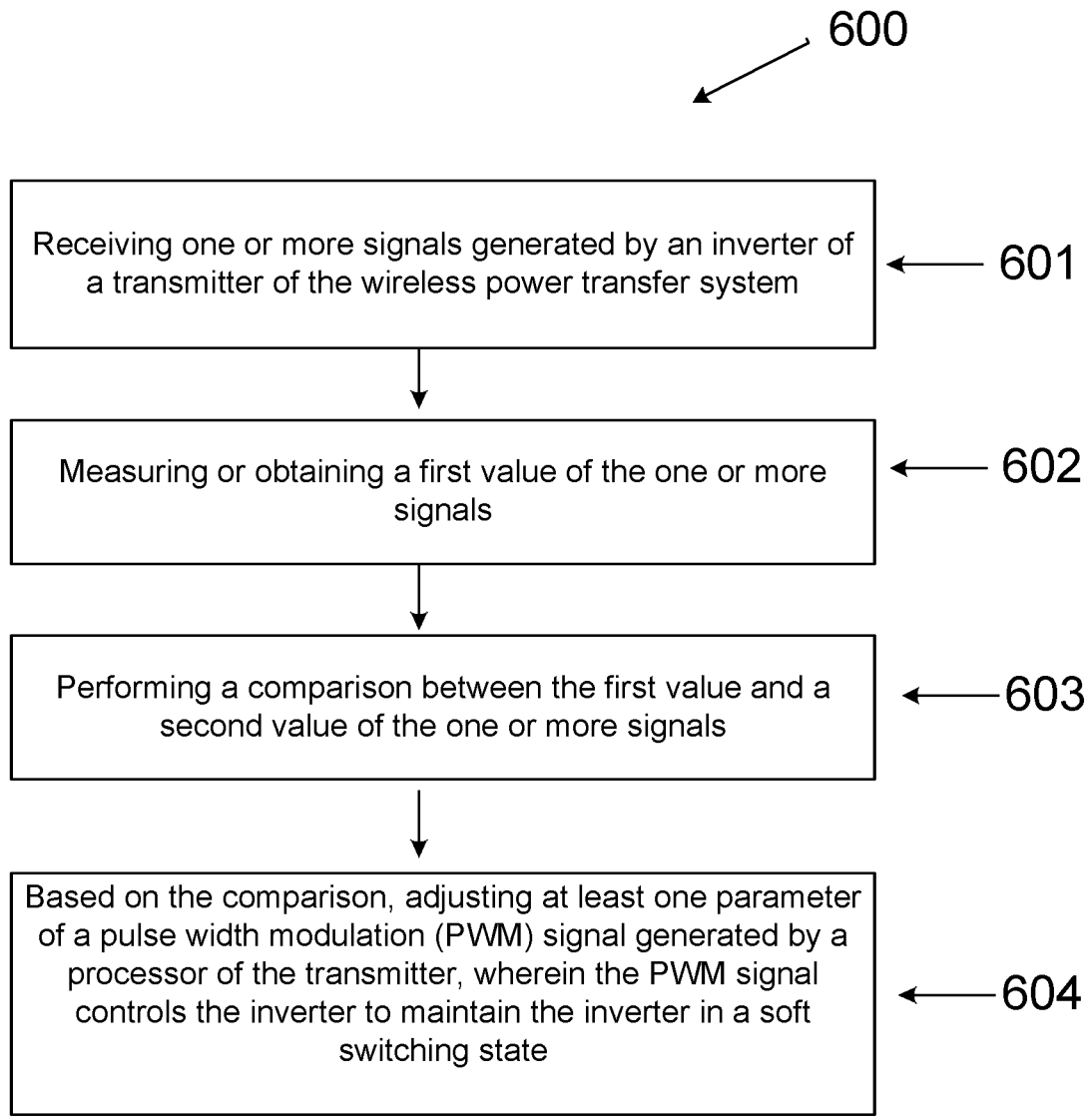
FIG. 6 illustrates a method of controlling a wireless power transfer system, according to one embodiment of the present disclosure.

FIG. 6 illustrates a method 600 of controlling a wireless power transfer system, according to one embodiment of the present disclosure. As shown, at block 601, the method includes receiving one or more signals generated by an inverter of a transmitter of the wireless power transfer system. At block 602, the method includes measuring or obtaining a first value of the one or more signals. At block 603, the method includes performing a comparison between the first value and a second value of the one or more signals. At block 604, the method includes based on the comparison, adjusting at least one parameter of a pulse width modulation (PWM) signal generated by a processor of the transmitter, wherein the PWM signal controls the inverter to maintain the inverter in a soft switching state.

The present disclosure can maintain the WPT system 100 to operate in a high efficiency state, e.g., a soft switching state, regardless of the loading conditions such as movement of the transmitter side or receiver side of the WPT system, or the change of the power delivery of the WPT system.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A transmitter of a wireless power transfer system, comprising:
   a processor;
   a memory storing executable instructions that, in response to execution by the processor, causes the processor to at least:
   receive one or more signals generated by an inverter of the transmitter, wherein the one or more signals include a plurality of current signals and a plurality of voltage signals;
   measure or obtain a first value of the plurality of current signals;
   measure or obtain a second value of the plurality of voltage signals;
   wherein the first value indicates a first adjustment of a pulse width modulation (PWM) signal generated by the processor by a first amount, and wherein the second value indicates a second adjustment of the PWM signal by a second amount; and
   select a larger one of the first amount and the second amount to adjust at least one parameter of the PWM signal, wherein the PWM signal controls the inverter to maintain the inverter in a soft switching state;
   wherein the at least one parameter includes a frequency of the PWM signal, or a phase of the PWM signal, or a duty cycle of the PWM signal.

2. The transmitter of claim 1, wherein the first adjustment indicates to increase the at least one parameter by the first amount, and the second adjustment indicates to decrease the at least one parameter by the second amount, or wherein the first adjustment indicates to decrease the at least one parameter by the first amount, and the second adjustment indicates to increase the at least one parameter by the second amount.

3. The transmitter of claim 1, wherein the first value includes an ampere value of the plurality of current signals.

4. The transmitter of claim 3, wherein the processor being caused to adjust the at least one parameter of the PWM signal includes being caused to adjust the at least one parameter of the PWM signal according to an inverse relation between the at least one parameter and the ampere value when the first amount is larger than the second amount.

5. The transmitter of claim 1, wherein the processor being caused to measure or obtain the second value includes being caused to:
   assign each of a plurality of weights to each of the plurality of voltage signals respectively; and
   calculate the second value including calculating a sum of products of each of the plurality of weights and each of the plurality of voltage signals respectively.

6. The transmitter of claim 5, wherein the processor being caused to adjust the at least one parameter of the PWM signal includes being caused to adjust the at least one parameter of the PWM signal according to a sign of the first second value when the second amount is larger than the first amount.

7. The transmitter of claim 1, wherein the processor being caused to adjust the at least one parameter of the PWM signal includes being caused to adjust the at least one parameter of the PWM signal upon determining that a difference between a desired value of the at least one parameter and an actual value of the at least one parameter is above a threshold.

8. A method of controlling a wireless power transfer system, comprising:
   receiving one or more signals generated by an inverter of a transmitter of the wireless power transfer system, wherein the one or more signals include a plurality of current signals and a plurality of voltage signals;
   measuring or obtaining a first value of the plurality of current signals;
   measuring or obtaining a second value of the plurality of voltage signals;
   wherein the first value indicates a first adjustment of a pulse width modulation (PWM) signal generated by the processor by a first amount, and wherein the second value indicates a second adjustment of the PWM signal by a second amount; and
   adjusting at least one parameter of the PWM signal by selecting a larger one of the first amount and the second amount, wherein the PWM signal controls the inverter to maintain the inverter in a soft switching state;
   wherein the at least one parameter includes a frequency of the PWM signal, or a phase of the PWM signal, or a duty cycle of the PWM signal.

9. The method of claim 8, wherein the first adjustment indicates to increase the at least one parameter by the first amount, and the second adjustment indicates to decrease the at least one parameter by the second amount, or wherein the first adjustment indicates to decrease the at least one parameter by the first amount, and the second adjustment indicates to increase the at least one parameter by the second amount.

10. The method of claim 8 wherein the first value includes an ampere value of the plurality of current signals.

11. The method of claim 10, wherein adjusting the at least one parameter of the PWM signal includes adjusting the at least one parameter of the PWM signal according to an inverse relation between the at least one parameter and the ampere value when the first amount is larger than the second amount.

12. The method of claim 8, wherein measuring or obtaining the second value includes:
   assigning each of a plurality of weights to each of the plurality of voltage signals respectively; and calculating the second value including calculating a sum of products of each of the plurality of weights and each of the plurality of voltage signals respectively.

13. The method of claim 12, wherein adjusting the at least one parameter of the PWM signal includes adjusting the at least one parameter of the PWM signal according to a sign of the first second value when the second amount is larger than the first amount.

14. The method of claim 8, wherein adjusting the at least one parameter of the PWM signal includes adjusting the at least one parameter of the PWM signal upon determining that a difference between a desired value of the at least one parameter and an actual value of the at least one parameter is above a threshold.

15. A computer-readable storage medium for controlling a wireless power transfer system, the computer-readable storage medium being non-transitory and having computer-readable program code stored therein that in response to execution by a processor of a transmitter of the wireless power transfer system, causes the processor to at least:
   receive one or more signals generated by an inverter of the transmitter, wherein the one or more signals include a plurality of current signals and a plurality of voltage signals;
   measure or obtain a first value of the plurality of current signals;
   measure or obtain a second value of the plurality of voltage signals;
   wherein the first value indicates a first adjustment of a pulse width modulation (PWM) signal generated by the processor by a first amount, and wherein the second value indicates a second adjustment of the PWM signal by a second amount; and
   select a larger one of the first amount and the second amount to adjust at least one parameter of the PWM signal, wherein the PWM signal controls the inverter to maintain the inverter in a soft switching state;
   wherein the at least one parameter includes a frequency of the PWM signal, or a phase of the PWM signal, or a duty cycle of the PWM signal.

16. The computer-readable storage medium of claim 15, wherein the first adjustment indicates to increase the at least one parameter by the first amount, and the second adjustment indicates to decrease the at least one parameter by the second amount, or wherein the first adjustment indicates to decrease the at least one parameter by the first amount, and the second adjustment indicates to increase the at least one parameter by the second amount.

17. The computer-readable storage medium of claim 15, wherein the first value includes an ampere value of the plurality of current signals.

18. The computer-readable storage medium of claim 17, wherein the processor being caused to adjust the at least one parameter of the PWM signal includes being caused to adjust the at least one parameter of the PWM signal according to an inverse relation between the at least one parameter and the ampere value when the first amount is larger than the second amount.

19. The computer-readable storage medium of claim 15, wherein the processor being caused to measure or obtain the second value includes being caused to:
   assign each of a plurality of weights to each of the plurality of voltage signals respectively; and
   calculate the second value including calculating a sum of products of each of the plurality of weights and each of the plurality of voltage signals respectively.

20. The computer-readable storage medium of claim 19, wherein the processor being caused to adjust the at least one parameter of the PWM signal includes being caused to adjust the at least one parameter of the PWM signal according to a sign of the second value when the second amount is larger than the first amount.

* * * * *